(No Model.)
W. BOYD.
WHEELED VEHICLE.
No. 279,529. Patented June 19, 1883.
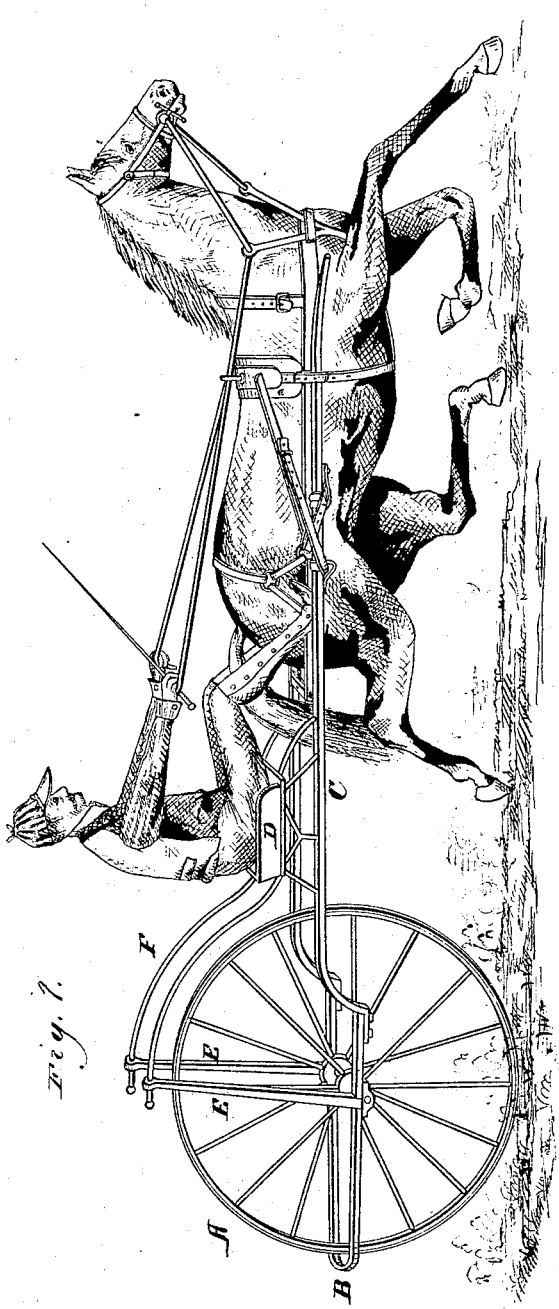
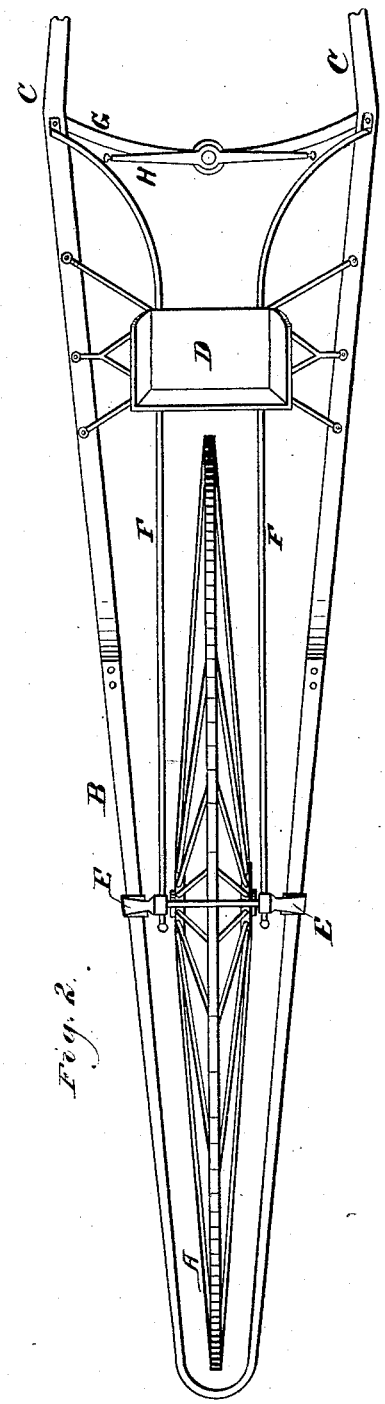
Witnesses,
Inventor.
William Boyd
per. F. F. Warner
his Attorney.

UNITED STATES PATENT OFFICE.

WILLIAM BOYD, OF GALVESTON, TEXAS.

WHEELED VEHICLE.

SPECIFICATION forming part of Letters Patent No. 279,529, dated June 19, 1883.

Application filed October 27, 1881. Renewed January 15, 1883. (No model.)

*To all whom it may concern:*

Be it known that I, WILLIAM BOYD, of Galveston, in the county of Galveston and State of Texas, have invented certain new and useful Improvements in Wheeled Vehicles, of which the following, in connection with the accompanying drawings, is a specification.

In the drawings, Figure 1 is a side elevation of a vehicle embodying my invention, and Fig. 2 is a top or plan view thereof.

Like letters of reference indicate like parts.

A represents the vehicle-wheel, and B is a frame in which it is journaled.

C C are the thills, which are connected to the frame B.

D is the driver's seat, mounted on the thills and connected thereto by means of suitable braces, as shown.

E E are standards extending vertically from the frame B.

F F are rods or braces passing through the upper ends of the standards E E. These braces pass underneath the seat, and their forward ends are connected to the thills.

G is a cross-bar connecting one thill with the other, and H is an evener pivoted to the bar G. The seat, as shown, is arranged between the wheel and the evener.

The wheel A may be made in any suitable way—by preference like the larger wheel of well-made bicycles, as indicated in the drawings.

It will be perceived from the foregoing description and from reference to the drawings that the vehicle is a one-wheeled sulky, that it is very light and simple in its construction, and at the same time strong and durable.

In the drawings I have represented a horse harnessed to the sulky, to indicate that the sulky, when in use, will be properly supported, it being understood that the thills should be so secured to the harness as to prevent the sulky from being tilted or rocked sidewise.

This sulky may not only be used in racing, but, besides the advantages already described, it will be very serviceable for travelers visiting unfrequented places, or where it may be desirable to leave a beaten track or road, for the sulky can follow wherever the horse can go.

Having thus described my invention, what I claim as new, and desire to secure by Letters Patent, is—

A one-wheeled sulky in which are combined the single wheel A, the frame B, the thills C C, the seat D, the standards E E, and the rods or braces F F, substantially as and for the purposes specified.

WILLIAM BOYD.

Witnesses:
JOHN J. HAND,
W. A. ZIEGLER.